Patented May 18, 1943

2,319,637

UNITED STATES PATENT OFFICE 2,319,637

STARCH PRODUCT AND METHOD OF MAKING

Herman H. Schopmeyer and George E. Felton, Hammond, Ind., assignors to American Maize-Products Company, a corporation of Maine No Drawing. Application August 2, 1940, Serial No. 350,167

6 Claims. (Cl. 127—33)

This invention relates to a starch product and the method of making it. More particularly the invention relates to thin bodied corn starch having the hitherto unrealized characteristics of high adhesive strength and substantial freedom from set-back of its aqueous gels.

It is customary to make a thin bodied or thin boiling starch by the warming of corn starch, potato starch or the like with a dilute acid, such as sulfuric or hydrochloric. The thin bodied starch so made has little adhesive strength. When used, for instance, in coating material for paper, the so-called wax or pick test of the starch is very low. In fact the result of the test is frequently under 1 on the standard scale for expressing the results. Furthermore, the thin bodied starch made in the conventional manner undergoes set-back of its aqueous gel, when the gel contains even as little as 1 part of the starch to approximately 15 parts of water, the set-back being objectionable for some purposes.

The present invention provides a thin bodied starch which is free from the objections of low adhesive strength and set-back of the gel, which disadvantages have been accepted heretofore as necessary features of thin bodied starch.

According to the invention, waxy starch is treated with a dilute aqueous solution of an acid until the fluidity of the starch is increased to a large and definite extent. The mixture is then neutralized. The resulting starch, modified by the acid treatment, is separated from the liquid of the mixture and suitably is washed and dried.

The product is a thin bodied starch having adhesive strength that may be as high as 7 or more, on the standard pick test scale, and being substantially free from set-back of its aqueous gel, even when the starch is present in proportion as high as 1 part of the starch to 4 parts of water.

The waxy starch used as the raw material is obtained from waxy maize or waxy corn, sorghum which contains waxy starch, or from other sources of waxy starch. The starch is characterized by the production of a reddish brown color with iodine, in contrast with the blue color developed under the same circumstances by the usual forms of starch. The waxy starch or waxy maize starch herein referred to is the material referred to by the same terms in an article by R. A. Brink published in The Biochemical Journal, vol. 22, No. 6, pages 1349–1361, for 1928.

The invention will be illustrated specifically by reference to the treatment of starch from waxy maize, it being understood that waxy starch from other sources may be substituted for the waxy maize starch and treated similarly.

The starch is separated from waxy maize in a manner that is usual for the preparation of starch from ordinary varieties of corn. The waxy maize is steeped in water containing a small amount of sulphur dioxide until the kernels are of satisfactory softness. The period of steeping is about 36 to 48 hours. The waxy maize is then milled, the germ removed by flotation, the fibre content removed by screens and the starch then separated from protein by tabling. The waxy starch so obtained may be dehydrated in a manner that is usual for producing a dry starch from tabled starch.

The waxy starch is then subjected to treatment to lower its viscosity substantially. This is accomplished by treating the waxy starch with a dilute aqueous solution of acid, the acid being used advantageously in proportion to establish the pH at about 1 to 4 and preferably at approximately 2. Such acids as sulfuric, hydrochloric, and acetic acid are suitable for use. The treatment is made at a temperature between room temperature and 140° F., the period of treatment being relatively long at the low temperatures within this range and short at the higher temperatures. The treatment is continued until the waxy starch comes to have an alkali fluidity, as determined in the standard procedure, of not substantially less than 20 or more than 96. The mixture is then treated with alkali to neutralize acid present. The neutralized mixture is subjected to filtration, centrifugal separation, or the like, to remove the modified starch as solid material from the liquid of the neutralized mixture. The starch is then washed with water to remove soluble impurities and is dried in a usual manner.

In one example of this general process the waxy maize starch was suspended in water to form a slurry of density of approximately 20° Bé. To this slurry there was added an aqueous solution containing 62.5% of sulfuric acid, the proportion of acid used corresponding to 1.1 parts of sulfuric acid on the dry basis for 100 parts of the total weight of the mixture. This proportion of sulfuric acid establishes the pH at approximately 1.8. The acidified slurry was maintained at 120 to 130° F. for 5 hours. The acid was then neutralized by the addition of the equivalent amount of sodium hydroxide, the neutralized mixture was filtered, and the starch remaining as solid material on the filter was washed with water and then dried.

The starch made as described in the preceding specific example was found by test to have an alkali fluidity of 62 and a pick test of 7.3 on paper, the tests being made in accordance with the standard methods. Boiled in water in the proportion of 1 part of starch to 4 of water, the starch showed no tendency to set-back on cooling of the gel. Furthermore, the warm gel showed a very high degree of clarity; it was not turbid but definitely translucent. On cooling, the mixture sets to a stringy gel. Furthermore, the thin bodied starch made as described has the additional characteristic of giving a reddish brown color with iodine dissolved in potassium iodide solution.

Because of the high adhesive strength of the thin bodied waxy maize starch, the starch may be used as sizing in the manufacture of paper. Or, the thin bodied waxy maize starch may be mixed with glue, whiting, or other paper coating materials to make a coating suitable for application to the surface of the paper. The sizing or coating may be applied to or incorporated in paper in a usual manner, as, for instance, by immersion of the paper in the composition or by brushing or spraying of the composition upon the paper, the application being followed by drying, as in festoon chambers, and then by calendering. Thin bodied waxy maize starch compositions so applied adhere well to the paper.

The acid treatment of the waxy maize starch, as described above, may be discontinued when the alkali fluidity test shows that the starch has been lowered in viscosity to the desired point. Thus, there may be made thin bodied waxy maize starch of alkali fluidity test corresponding to 20, 30, 40, 60, 80, 90, or 96.

The alkali fluidity test referred to herein is made as follows: 5 grams of 10% moisture starch is first placed in a beaker and wetted with 10 cc. of distilled water. To this, 90 cc. of 1% sodium hydroxide solution is added and the whole stirred for one minute, the temperature being brought at the same time to about 75° F. The mixture is held at 75° for 30 minutes and the amount that will flow through a standard sized orifice on a funnel in a minute is determined. The number of cc. obtained is translated directly to the number indicating the viscosity of the starch. That is, 60 cc. indicates 60 fluidity starch. The funnel is initially standardized so that it will run 100 cc. of distilled water 75° F. in one minute.

The pick test is made as follows: 24 grams of starch are cooked up with 175 grams of water and the resulting paste mixed with 188 grams of clay slip. The product is then thoroughly homogenized and coated on paper stock. The coated paper is allowed to dry overnight. Standardized waxes having varying adhesive strengths are then applied to the paper, allowed to cool and set firmly, and very carefully cracked off. These waxes are calibrated and numbered from 1 to 12, the higher numbers indicating the greater adhesive strength. After the wax has been cracked off, the wax is carefully examined to see whether the coating originally applied to the paper adheres to the paper or to the wax. For example, if wax 6 is found to break free from the paper without damaging the surface of the paper, the strength of the coating is greater than the strength of the wax and the wax test or pick test is above 6. If the wax in breaking off were found to tear the coating, that would indicate that the wax had greater strength than the coating and the pick test was below 6. The pick test is the lowest number of wax that does break the coating on the paper.

It is to be understood that the details given are for the purpose of illustration and that variations within the spirit of the invention are intended to be included in the scope of the appended claims.

What we claim is:

1. In making a thin bodied starch of high adhesive strength and substantial freedom from set-back of its aqueous gel, the method which comprises warming a mixture of waxy maize starch and a dilute aqueous solution of an acid at a temperature above room temperature but not substantially above 140° F. until the starch in the mixture has an alkali fluidity not substantially below 20 or above 96, and then neutralizing the acid.

2. In making a thin bodied starch, the method which comprises forming a mixture of pH approximately 1 to 4 including waxy starch, acid, and water, maintaining the mixture in warm condition at a temperature above room temperature but not substantially above 140° C. until the starch in the mixture has an alkali fluidity not substantially below 20, and then neutralizing the acid.

3. In making a thin bodied starch, the method which comprises forming a mixture of pH approximately 1 to 4 of waxy starch, acid, and water, maintaining the mixture at a temperature not substantially above 140° F. until the viscosity of the starch is lowered substantially, then neutralizing the acid, filtering the neutralized mixture to separate the thin bodied starch as solid material on the filter, and washing and drying the said solid material, to form a thin bodied starch characterized by substantial freedom from set-back of its aqueous gel containing as much as about 1 part of the starch to 4 parts of water and by high pick test when applied to paper.

4. In making thin bodied starch, the method which comprises forming an aqueous slurry containing waxy starch in proportion to make the density of the slurry approximately 20° Bé. and containing sulfuric acid in proportion to establish the pH at about 2, warming the slurry and maintaining the temperature at approximately 110 to 140° F. until the starch in the slurry has an alkali fluidity not substantially below 20 or above 96, then neutralizing the acid, separating the solid material from liquid in the mixture, and drying the said solid material, to form dried thin bodied starch characterized by high adhesive strength.

5. In making thin bodied starch, the method which comprises forming an aqueous slurry containing waxy maize starch and a dilute acid establishing the pH at a value not substantially above 4, warming the slurry to a temperature of approximately 120 to 130° F. and maintaining the temperature until the alkali fluidity test shows a value of about 20 to 96, then neutralizing the acid, separating the solid material from liquid in the mixture, and drying the said solid material, to form dried thin bodied starch characterized by high adhesive strength.

6. An acid thinned waxy starch comprising the product of the treatment of waxy starch with a dilute aqueous solution of an acid so as to lower the viscosity of the starch, the thin bodied starch giving a reddish brown color with iodine, being substantially free from set back of its aqueous gels containing as much as approximately 1 part of starch to 4 parts of water, having an alkali fluidity not substantially below 20, and showing a high pick test when applied to paper and subsequently tested.

HERMAN H. SCHOPMEYER.
GEORGE E. FELTON.